INVENTOR
LORENZ V. CLAUSSEN
ATT'YS.

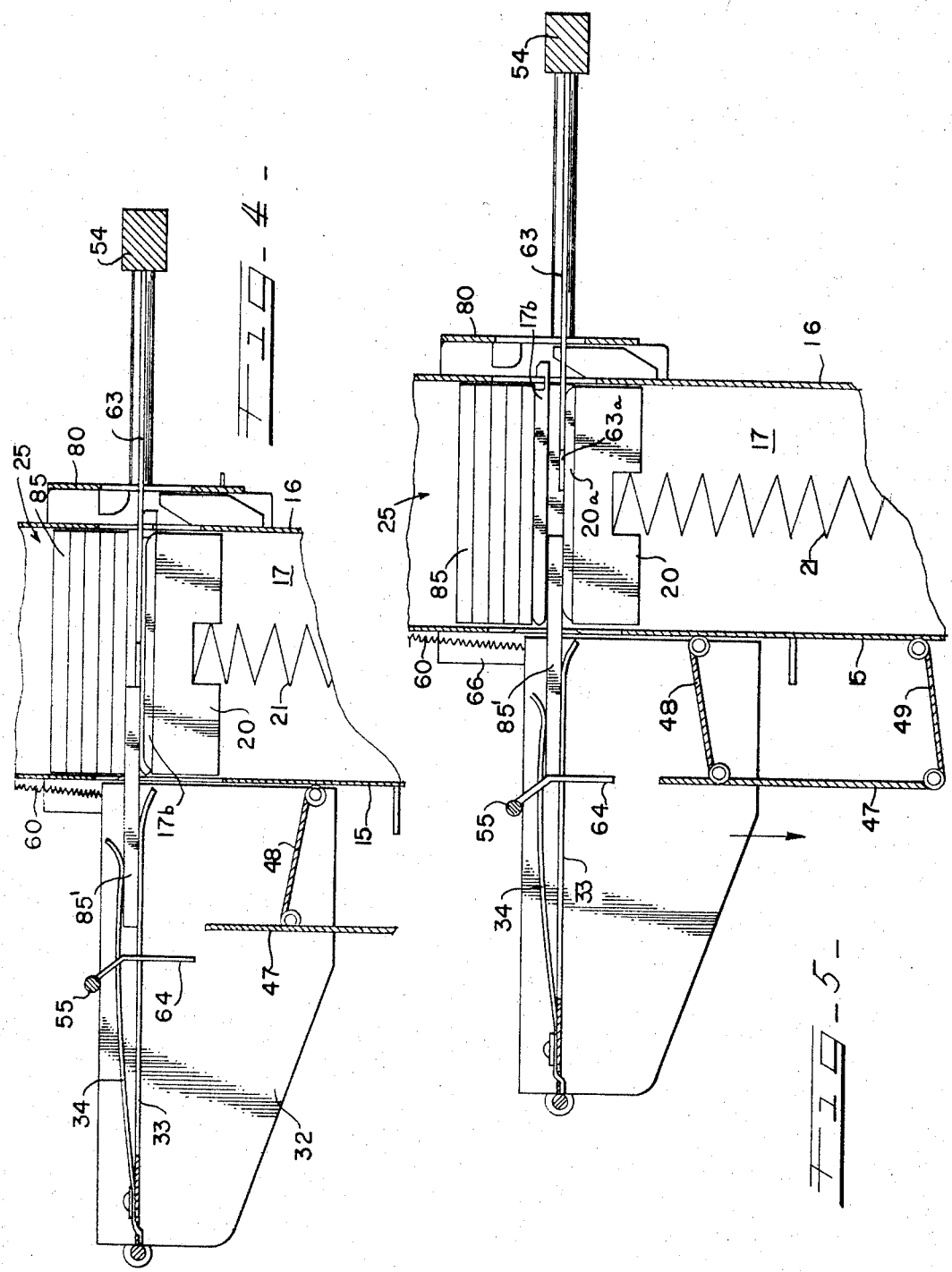

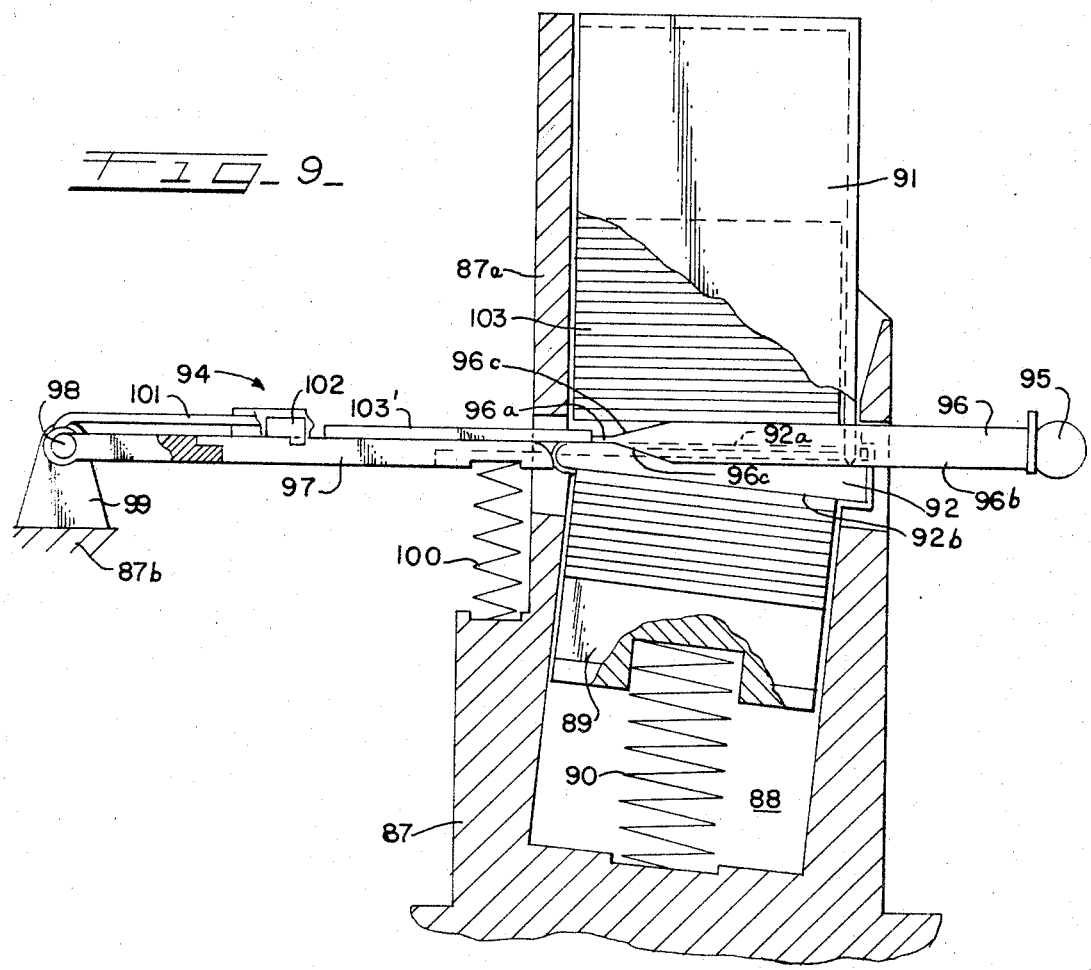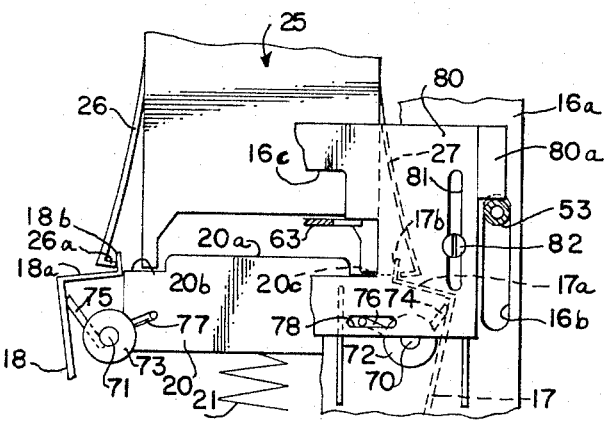

United States Patent Office 3,434,229
Patented Mar. 25, 1969

3,434,229
SLIDE CHANGING DEVICE
Lorenz V. Claussen, Northeim, Germany, assignor to GAF Corporation, a corporation of Delaware
Filed Jan. 17, 1967, Ser. No. 609,904
Int. Cl. G09f 11/30
U.S. Cl. 40—79   18 Claims

ABSTRACT OF THE DISCLOSURE

A pair of movably mounted rails separate a stack-type magazine into supply and take-up areas. These rails, which extend between opposing marginal portions of a pair of slides, may be moved away from each other to place the supply and take-up areas in communication with each other for movement of slides longitudinally of the magazine from the supply area to the take-up area and vice versa. Biasing means are provided in the take-up area for simultaneously returning all slides therein to the supply area when the rails are in their spread apart position. This permits the operator at any time to return all slides in the take-up magazine to the supply magazine for removal and replacement.

---

The slide changing device itself includes a gate and a reciprocating slide changer, both mounted on the magazine adjacent the rails for shifting movement generally longitudinally of the magazine. By this shifting movement, a slide pushing tongue forming part of the slide changer may be positioned on either side of the rails thereby permitting the slide changing mechanism to reciprocate a slide back and forth between the supply area and the gate and also back and forth between the take-up area and the gate. Such construction permits reversal of the sequence of exhibiting slides.

Background of the invention

The field of the invention is in the art relating to slide changing devices, and more particularly to slide changing devices associated with stack-type magazines.

Parlini et al. Patent 2,583,442 discloses a slide changing device for a stack-type magazine. The present invention constitutes an improvement over the Parlini et al. mechanism. Among other things, the slide changing device of this invention provides for reversing the sequence of exhibiting slides which is not possible in the Parlini et al. device. Further, the present invention provides for simultaneously returning all slides in the take-up area to the supply area at any time, which important feature is not present in the Parlini et al. structure.

Summary of the invention

The invention has to do with a unique slide changing device for use with stack-type magazines, i.e., magazines of the type wherein the slides are held therein in face-to-face contact. The invention primarily relates to a slide changing assembly including a gate and a reciprocal slide changer, the entire slide changing assembly being shiftably mounted for movement relative to the magazine generally longitudinally thereof to advance slides seriatim from the supply magazine, to the projection gate and then to the take-up magazine, and also to advance slide seriatim in the reverse order, i.e., from the take-up magazine, to the gate and then to the supply magazine, at all times maintaining the slides in the stack in their same order or arrangement. The invention also includes a pair of rails which divide the magazine into supply and take-up areas, these rails being movable away from each other so as to place these two magazine areas in communication with each other. Biasing means are provided in one of the magazine areas for simultaneously returning all slides therein to the other area when the rails are in their spread apart position. These rails cooperate with a slide changing tongue forming part of the slide changing mechanism to permit the slide changing operation explained above.

A primary object of the present invention is the provision of a new and improved slide changing device for use with a stack-type magazine.

Another object of the present invention is the provision of a new and improved slide changing device of the type descibed which is capable of advancing slides seriatim in forward and reverse directions.

Still another object of the present invention is the provision of an associated magazine having rails which cooperate with the aforesaid slide changing device, which rails in one position thereof divide the magazine into supply and take-up areas and in another position thereof place these areas in communication with each other.

Still another object of the invention is the provision of a magazine having movable dividing means for alternately separating the magazine into supply and take-up areas and for placing these areas in communication with each other, such magazine including biasing means in one of these areas for simultaneously returning all of the slides therein to the other area when the magazine areas are placed in communication with each other.

These and other objects and advantages of the invention will become apparent from the following specification disclosing preferred embodiments in the accompanying drawings.

Description of the drawings

FIG. 4 is an enlarged, fragmentary, elevation similar to FIG. 2 and showing a slide midway between the supply area of the magazine and the projection gate;

FIG. 5 is an enlarged, fragmentary, elevation similar to FIG. 4 and showing a slide midway between the projection gate and the take-up area of the magazine;

FIG. 6 is a perspective view of a slide holding device adapted to be detachably received in the supply area of the magazine;

FIG. 7 is a front elevational view of the slide holding device;

FIG. 8 is a section taken along the line 8—8 of FIG. 1 with certain parts being removed and broken away for better illustration of the invention; and FIG. 9 is a partial vertical section and partial elevation showing a modified form of slide changing device.

Description of the preferred embodiments

Figure 1:
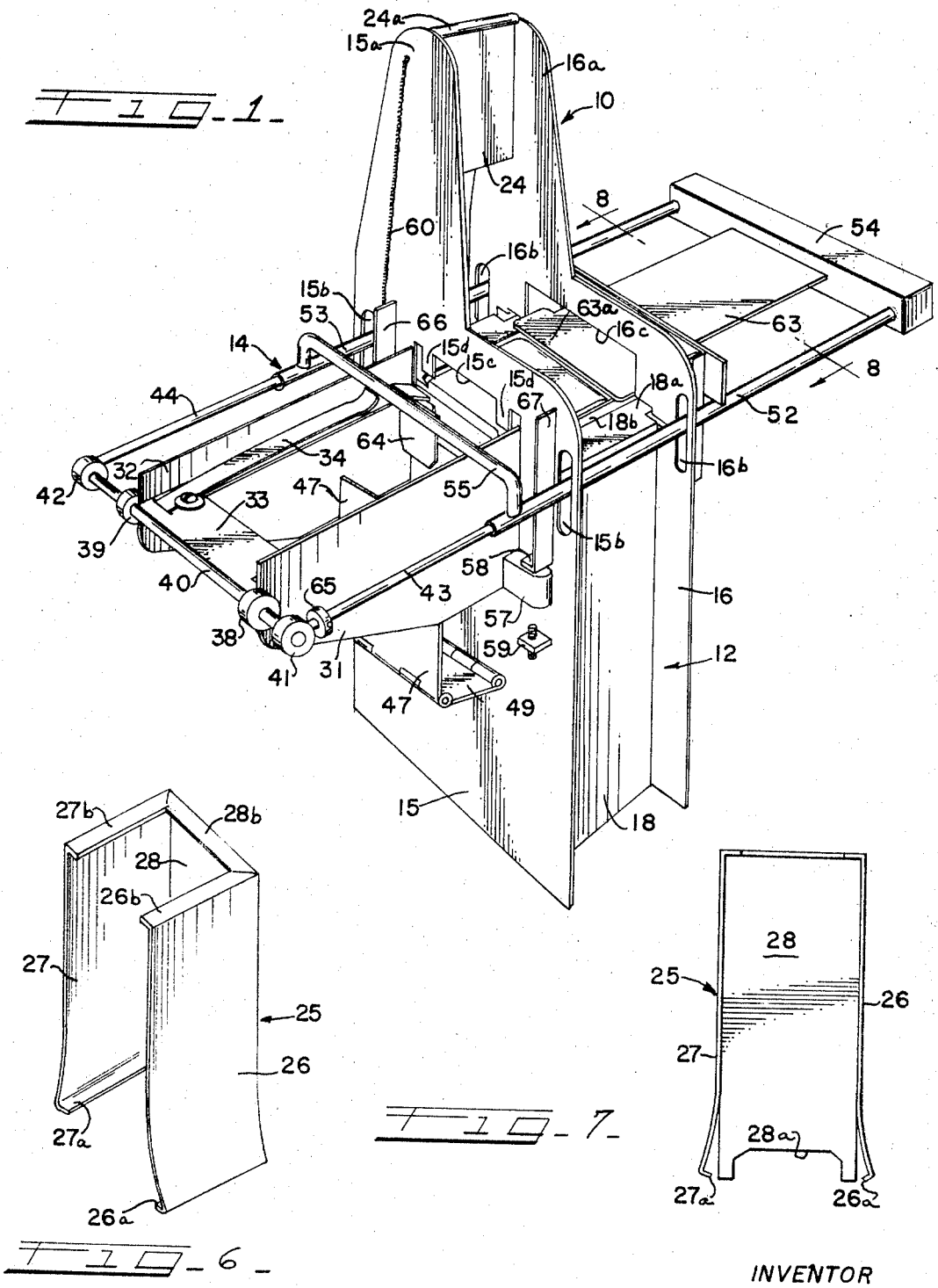
FIG. 1 is a perspective view of a slide changing device constructed in accordance with the present invention.
Figure 2:
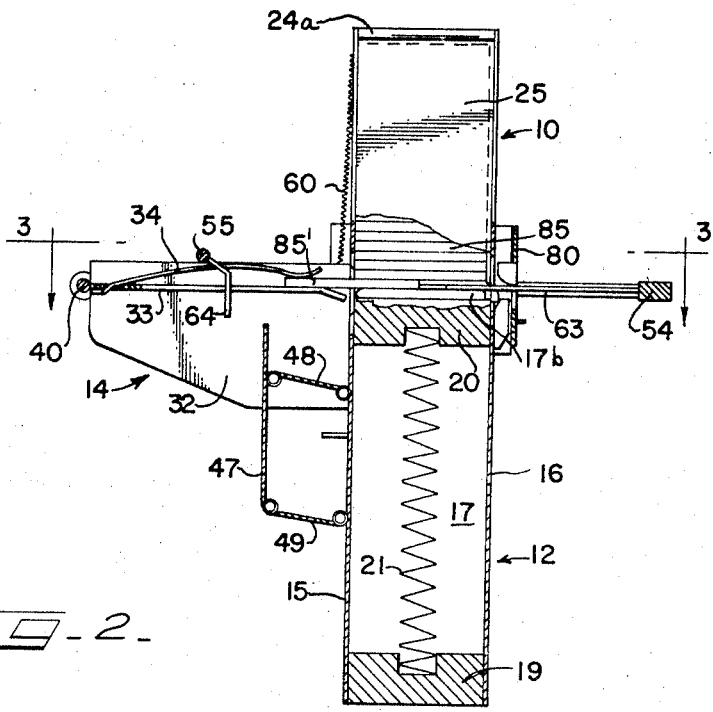
FIG. 2 is a reduced side elevation of the slide changing device with certain parts removed or broken away for better illustration of the invention.

Referring particularly to FIGS. 1 and 2, the slide changing device of the present invention will be seen to include a vertically extending stack-type slide magazine having a supply area generally designated 10 and a take-up area generally designated 12. The slide changing device includes a slide changing assembly generally designated 14.

The magazine take-up area includes a first set of opposed side walls 15, 16 and a second set of opposed side walls 17 and 18. These walls define an elongated, square-in-cross-section chamber closed at the bottom by a base plate 19. The side walls 17 and 18 are secured to the base 19 and to the other side walls 15 and 16 only adjacent the lower ends of the latter, thereby leaving the upper ends of the walls 17 and 18 free to flex toward and away from each other between the walls 15 and 16. The upper ends of the walls 17 and 18 are bent inwardly toward each other as indicated at 17a, 18a in FIG. 8. These inwardly extending portions are bent upwardly to form slide supporting rails 17b and 18b as best seen in FIG. 8.

The take-up magazine area 12 further includes a rectangular pressure plate 20 mounted for reciprocal sliding movement within the take-up area. Pressure plate 20 includes an upstanding portion 20a on the top thereof separating planar flange portions 20b, 20c which normally engage the undersurfaces of the side wall portions 18a, 17a, respectively. Suitable biasing means, such as a spring 21, has opposite ends thereof in respective engagement with the base plate 19 and the pressure plate 20 for urging the latter upwardly in the take-up area 12.

The supply magazine area 10 is defined in part by upwardly disposed extensions 15a, 16a of the plates 15, 16. These extended plate portions support at right angles thereto a vertically disposed separating plate 24. The wall portions 15a, 16a and the separating plate 24 define a space for detachably receiving the slide holding device 25, best illustrated in FIGS. 6 and 7.

The slide holder 25 includes opposed side walls 26, 27 connected adjacent the upper end of the holder to another wall 28. As noted in FIG. 7, the side walls 26, 27 are not connected to the other wall 28 adjacent the lower end of the slide holder, thereby allowing the lower end of the walls 26, 27 to be flexed toward and away from each other. The lower ends of the walls 26, 27 include integral, inwardly extending lips 26a, 27a, respectively. The lower end of the wall 28 has a cut-out portion 28a to permit entry of a tongue forming part of the slide changer as will be explained hereinbelow. The upper ends of the walls 26-28 include respective inwardly extending flanges 26b, 27b and 28b which are arranged to engage marginal portions of the last slide in a stack of slides in the holder thereby to prevent exit of slides from the upper end of the holder 25.

It will be understood that a stack of slides is inserted in the holder 25 through the open space defined by the longitudinally extending edges of the walls 26, 27. The lower ends of the walls 26, 27 are normally in an unflexed condition and in coplanar relation with the remaining portions of these walls, in which case the lips 26a, 27a engage opposed marginal portions of the lowermost slide thereby to hold a stack of slides in the holder 25. The holder 25 loaded with slides is then snapped or detachably disposed in the space between the upper wall portions 15a, 16a with the upper portion of the wall 27 in contact with the separating wall 24, the latter having an upper, rolled edge 24a for engaging the flange 27b thereby to aid in mounting the holder 25 in place. When the holder 25 is mounted in place as just described, the lower end portions of the walls 26 and 27 will be in an unflexed condition (not spread as shown in FIGS. 6 and 7) and the lips 26a, 27a will have the rails 17b, 18b disposed therebetween. The upper edges of the rails 17b, 18b extend above the lips on the slide holder 25 and thereby actually support the stack of slides in the holder.

Figure 3:
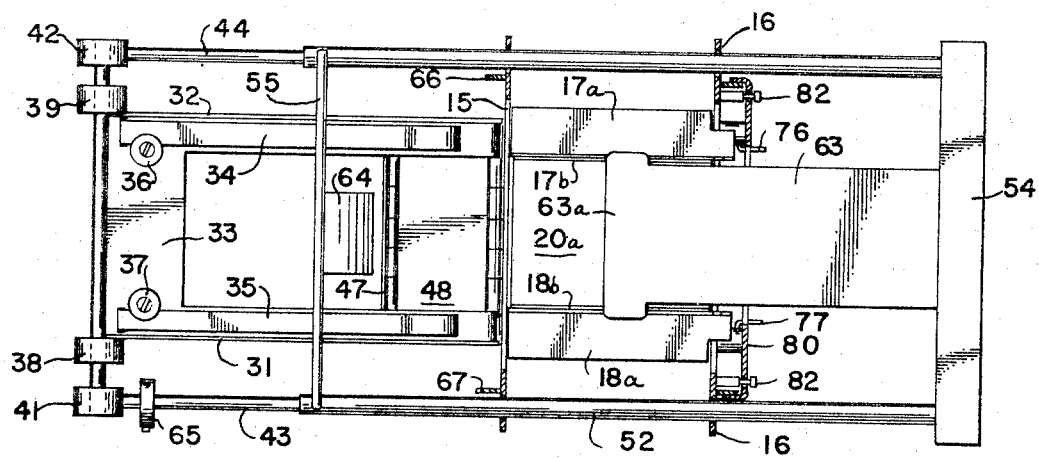
FIG. 3 is an enlarged section along the line 3—3 of FIG. 2.

The slide changing assembly 14 includes a projection or display gate defined by a pair of plates 31, 32 secured in spaced parallel relation by a horizontally disposed, U-shaped frame plate 33. A pair of leaf springs 34, 35 (FIG. 3) are secured at corresponding ends to the bight portion of the plate 33, as by means of fasteners 36, 37, which springs extend along the leg portions of the frame plate 33 for holding a slide in the display position as will become apparent hereinbelow. Plates 31, 32 support respective journals 38, 39 which mount a shaft 40. Collars 41, 42 are secured to respective opposite ends of the shaft 40, which collars mount respective ends of a pair of rods 43, 44.

The slide changing assembly 14 is mounted for shifting movement relative to the magazine longitudinally thereof by a parallel linkage arrangement including a web plate 47 secured to both plates 31, 32. The web plate 47 is hingedly connected to a pair of spacer plates 48, 49, which plates are in turn hingedly connected to the magazine plate 15. The plates 47–49 mount the frame plate 33 in a plane perpendicular to the longitudinal axis of the magazine and support such plate, and the various parts connected thereto, for reciprocal or shifting movement longitudinally of the magazine and in doing so matintain the frame 33 at all times in a plane perpendicular to the longitudinal axis of the magazine.

The slide changer itself includes a pair of parallel tubes 52, 53 which at corresponding ends thereof slidably receive respective rods 43, 44. An actuating handle or bar 54 is connected to the other ends of the tubes 52, 53. A rod 55 of inverted U shape has its respective opposite ends secured to the tubes 52, 53 and slides along the upper edges of the plates 31, 32. This sliding engagement between the rod 55 in the upper edges of the plates 31, 32 maintains the rods 43, 44 and tubes 52, 53 in a plane parallel with the plane containing the frame plate 33. As will become apparent from the description of the operation of the slide changing device, this engagement between the rod 55 and the upper edges of the plates 31, 32 also causes downward movement or shifting of the projection gate upon corresponding downward movement of the actuating handle 54. It will be noted that the actuating handle 54 and the tubes and rods connected therewith may be rotated relative to the frame plate 33 by reason of the shaft 40 being supported in the journals 38, 39. It will be seen that the tubes 52, 53 are received in pairs of vertically extending slots 15b, 16b thereby to permit reciprocation or shifting of the slide changing assembly 14 relative to the magazine.

The amount of shifting or reciprocal movement of the slide changing assembly 14 relative to the magazine is determined and controlled by a lug 57 which extends from the plate 31 and which alternately engages a fixed stop 58 and an adjustable stop 59, both stops being mounted from the plate 15. A spring 60 has one end thereof connected to the plate 32 and the other end thereof connected to the plate extension 15a thereby to urge the slide changing assembly 14 to its uppermost position wherein the lug 57 engages the fixed stop 58.

A slide pushing tongue 63 has one end thereof attached to the actuating bar 54. The other end of this tongue extends through an opening 16c (FIG. 1) in the plate 16. This end of the tongue has a widened portion 63a for sliding engagement with the rails 17b, 18b both over and under the latter as will be explained hereinbelow. The remaining portion of the tongue 63 has a width permitting the same to pass between the rails 17b, 18b during shifting or reciprocation of the slide changing mechanism 14 relative to the magazine when the widened end 63a of the tongue is disposed in the projection gate. The rod 55 mounts a slide pushing tab 64 for returning a slide from the projection gate to either the supply magazine area or the take-up magazine area.

The plate 15 includes an opening 15c to permit passage of a slide back and forth between the projection gate and the supply magazine. A pair of tabs 15d extend downwardly into this opening to permit passage of only one slide at a time as will be explained below.

It should be apparent that the actuating handle or bar 54 may be grasped by the hand of the operator for reciprocating the slide pushing members 63, 64, such movement being permitted by the sliding engagement between rods 43, 44 and respective tubes 52, 53. Movement of these slide pushing members to the left as viewed in FIG. 1 is limited by engagement of the end of the tube 52 with an adjustable stop collar 65 which is mounted on the rod 43. Movement of the slide pushing members to the right is limited by engagement of the rod 55 with ribs 66, 67 which are supported from the plate 15, the rib 67 having the lower end thereof bent to form the fixed stop 58. It should also be apparent that the bar 54 may be pushed down and pulled upwardly for shifting the slide changing assembly 14 up and down when the tongue 53 is fully withdrawn, in which case the end 63a thereof is clear of the rails and pressure plate 20, and when the tongue 63 is in its fully inserted position, in which case the narrower portion thereof will pass between the rails 17b, 18b.

Referring now to FIG. 8, it will be understood that take-up magazine plates 15 and 16 support opposite ends of a pair of rods 70, 71. These rods rotatably mount respective tubes 72, 73. These tubes in turn support respective camming bars 74 and 75. Arms 76, 77 extend radially outwardly from respective tubes 72, 73 at the ends of the latter adjacent the magazine plate 16. These arms have outwardly bent ends slidably received in a pair of horizontally extending slots 78 formed in an actuating plate 80. Only a portion of this actuating plate is illustrated in FIG. 8; it will be understood that the same is symmetrical with respect to the vertical centerline thereof. The plate 80 has vertically extending slots 81 slidably receiving pins 82, the latter being fixedly mounted from the magazine 16. It should be apparent that the plate 80 is mounted for vertical reciprocal movement relative to the magazine. The actuating plate has oppositely extending ears 80a which extend over the tubes 52, 53.

The operation of the embodiment shown in FIGS. 1–8 is as follows:

Assume a stack of slides 85 (FIG. 2) is contained within the holder 25 and the latter snapped in place between the upwardly extending plate portions 15a and 16a. It will be recalled from the above description that the slides in the stack will actually be supported by the upper edges of the rails 17b and 18b. When the holder 25 is in place, the cut-out portion 28a will be in registry with opening 16c. Assume further that the slide pushing tongue is fully withdrawn in which case the leading edge thereof will be spaced just slightly outwardly of the pressure plate 20a. The spring 60 acts to urge the slide changing assembly upwardly with the lug 57 in engagement with the fixed stop 58, in which case the slide pushing tongue 63 will be coplanar with the lowermost slide 85' in the stack of slides. As the actuating bar 54 is pushed inwardly the leading edge of the tongue 63 will enter the opening 16c, cut-out area 28a and engage the trailing edge of the slide 85 for pushing the same through the opening 15c and toward the projection gate. The widened portion 63a of the tongue will therefore slide between the upper edges of the rails 17b, 18b and the undersurface of the slide in the stack adjacent the slide 85'. The downwardly extending tabs 15d prevent such adjacent slide from being drawn along with the slide 85' by frictional engagement between these two slides. Continued inward movement of the tongue 63 will cause the leading edge of the slide 85' to engage the upturned ends of the springs 34, 35 thereby resulting in the slide being slid between these springs and the upper surface of the frame plate 33. The actuating bar 54 is pushed inwardly until the end of the tube 52 strikes the adjustable stop 65 in which case the slide 85 will be in position for exhibition. FIGS. 2 and 4 illustrate the slide 85' about midway between the magazine and the projection gate.

After the slide has been exhibited, the actuating bar 54 is pushed downwardly thereby causing the projection gate consisting of the frame plate 33 and side plates 31, 32 to be lowered until the lug 57 strikes the adjustable stop 59. The lowering of these various parts results from the engagement of the rod 55 with the upper edges of the plates 31, 32. During this lowering movement, the tongue 63 passes between the rails 17b, 18b. The slide 85' will now be in a plane just below the undersurfaces of the inturned portions 17a, 18a of the side plates 17 and 18. The actuating bar 54 is then pulled in a reverse direction bringing the slide pushing tab 64 into engagement with the trailing edge of the slide for pushing the same into the take-up area as seen in FIG. 5. It will be apparent that the slide 85' is slid between the undersurfaces of the portions 17a, 18a of the side plates and the upper surface of the pressure plate portion 20c. The pressure plate is accordingly cammed or forced downwardly against the spring 21. When the slide is fully inserted in the take-up area by the pushing member 64, the widened end 63a of the tongue will be clear of the rails 17b, 18b, in which case the entire slide changing assembly 14 may be raised under the influence of the spring 60. The slide changing assembly is now in position for advancing the next slide in the stack to the projection gate and then returning such slide to the take-up magazine area.

It should be apparent that slides may be advanced in the reverse sequence, i.e., from the take-up area, to the gate, and then to the supply area. To achieve this reverse operation, the actuating handle or bar 54 is depressed prior to inserting the same in which situation the tongue 63 will be lowered to a position coplanar with the uppermost slide in the take-up magazine. As the actuating bar is then pushed inwardly, the tongue 63 will push the slide back into the projection gate. FIG. 5 also illustrates the arrangement of the various parts as the slide is being returned to the projection gate from the take-up magazine area. As soon as the slide is returned to the take-up area, the actuating bar 54 may be released for allowing the spring 60 to raise the entire slide changing assembly 14. After the slide has been exhibited, it may be returned to the supply area by pulling outwardly on the actuating handle 54 thereby bringing the tab 64 into engagement with the trailing edge of the slide. During the course of return movement of the slide from the projection gate to the supply area, slight upward lifting on the actuating bar 54 will cause the tongue 63 to lift any remaining slides in the supply area to form a space for the returning slide.

It should be apparent that after all of the slides in the supply area have been exhibited and collected in the take-up area, the slides may be again exhibited in reverse order and returned to the supply magazine, all the time maintaining their same order with respect to each other. Also, even if it is not desired to exhibit all the slides in reverse order as just explained, any one slide may be momentarily returned from the take-up magazine to the gate for viewing simply by pressing downwardly on the actuating handle 54 and then sliding the same inwardly to push the slide from the take-up area to the gate. After reviewing of a slide, the handle is pushed downwardly and pulled away from the magazine for returning the slide to the take-up area. With respect to FIG. 5, it will be understood that successive slides will be pushed into the take-up magazine between the uppermost slide therein and the undersurfaces of the portions 17a, 18a of the plates 17 and 18.

If it is desired to return all slides in the take-up area directly to the supply area without exhibiting such slides individually, the actuating handle 54 is pulled upwardly as far as possible. It will be recalled that the actuating bar 54 and tubes 52, 53 may be swung upwardly relative to the various plates defining the projection gate by reason of the rod 40 being journaled in the members 38, 39. This additional upward movement of the actuating bar 54 brings the tubes 52, 53 into engagement with the ears 80a of the actuating plate 80 thereby lifting the latter. Such upward movement of the actuating plate causes clockwise rotation of the tube 72 (FIG. 8) and counterclockwise rotation of the tube 73 by reason of the sliding engagement between the arms 76, 77 and the horizontal slot 78. Such rotation of the tubes 72, 73 swings the camming bars 74, 75 into engagement with the upper ends of the side plates 17 and 18 thereby flexing the same outwardly. This outward movement of the upper ends of the side plates 17 and 18 brings the rail members 17b and 18b into respective engagement with the lips 26a and 27a of the slide holder 25 thereby flexing the same away from each other as viewed in FIG. 8. The uppermost slide in the stack of slides in the take-up area will no longer be held by the plate portions 17a and 18a and accordingly the spring 21 will act to lift the pressure plate 20 and all the slides thereabove for returning such slides to the supply magazine. It will be understood that the spring 21 has sufficient strength for lifting an entire stack of slides. Therefore, by reason of the construction just described, at any time during exhibition of the stack of slides, all of the slides in the take-up area may be simultaneously and quickly returned to the supply magazine where they will be disposed within the slide holder 25. When the actuating bar 54 is lowered to its initial position, in which case the tubes 52, 53 are in a plane perpendicular to the longitudinal axis of the magazine and the lug 57 is in engagement with the stop 58, the rails 17b, 18b, lips 26a, 27a and the pressure plate 20 will be returned to their original positions.

A suitable optical system for use with the slide changing device just described has not been illustrated, as it is believed that many possible optical systems will be apparent to those skilled in the art. In the particular embodiment shown, the light source could be disposed, for example, under the projection gate and a mirror supported above the projection gate at a 45° angle for projecting an image along a horizontal axis. It will of course be appreciated that the magazine including respective supply and take-up areas 10 and 12 may be horizontally disposed rather than vertically disposed as illustrated, in which case suitable means, similar to the spring 21 and pressure plate 20, will be provided in the supply area for urging slides toward the rails 17b, 18b which divide the magazine into the supply and take-up areas. In such an arrangement, the optical axis passing through the display gate will of course also be horizontal. The respective springs in the horizontally disposed supply and take-up magazine areas would cooperate to urge slides toward the rails and to cause simultaneous shifting of all slides in the take-up area to the supply area upon separation of the rails.

The modified slide changing device, more or less diagrammatically shown in FIG. 9, differs from the embodiment described above mainly in that in the former the entire slide changing assembly is pivotally mounted for swinging the slide pushing tongue for alternate slidable engagement with opposite sides of the rails which separate the supply area from the take-up area. Looking now to the FIG. 9 modification, suitable supporting structure or a base 87 includes a rectangular-in-cross-section space or cavity 88 which defines the take-up magazine area. A pressure plate 89 is slidably mounted in this cavity for reciprocal movement, and a spring 90 with opposite ends thereof engaging the base of the space 88 and the pressure plate 89 urges the latter upwardly. The supporting structure 87 includes upstanding wall portions 87a defining a slide supply area adapted for detachably receiving a slide holder 91, which may be similar to the slide holder 25 described above. It will be noted that the take-up area or space 88 is tilted or canted with respect to the longitudinal axis of the slide holder 91; the purpose of this inclined relation between the slide supply and take-up areas will become apparent. A pair of rails 92, similar in function and operation to the aforementioned rails 17b, 18b, separate the supply and take-up magazine areas. Each of the rails 92 has an upper surface 92a contained in a horizontal plane and a lower surface 92b contained in an inclined plane which is perpendicular to the longitudinal axis of the take-up area or space 88.

A slide changing assembly, generally designated 94, includes an actuating bar or handle 95 connected with a slide pushing tongue 96. Suitable supporting means (not shown) mount the handle 95 and tongue 96 for reciprocal sliding movement in a plane parallel with a frame plate 97. It will be understood that the tongue 96 has a widened end 96a for alternate sliding engagement with the rail surfaces 92a and 92b. The remaining portion 96b of the tongue has a width permitting this portion to pass between the rails 92. The portion 96b is thickened joining with the end 96a at inclined surfaces 96c which act as camming means for forcing the stacks of slides away from the tongue to make a space for a slide entering the supply and take-up magazine areas.

The entire slide changing assembly 94 is pivotally mounted at one end thereof about a pin 98 which is supported by one or more members 99, the latter being mounted on suitable supporting structure 87b. The frame plate 97 is mounted for swinging movement about the pin 98 independently of the tongue 96 and the supporting means for the latter; a spring 100 engages a step on the base 88 and the frame plate 97 for yieldably urging the latter into parallel relation with the plane of reciprocal movement of the tongue 96. Suitable means 101 are adapted to hold a slide on the frame plate 97 for exhibition of the latter. Accordingly, the frame plate 97 and the means 101 together constitute the projection or display gate. A slide pushing member 102 is supported for sliding movement along with the tongue 96.

It should be apparent when the tongue 96 is in a horizontal plane as shown in FIG. 9, sliding movement of the same from right to left will push the slide 103' to the projection gate, such slide being the lowermost slide in a stack of slides 103. After this slide has been exhibited, the actuating bar 95 is pushed or shifted downwardly for swinging the entire slide changing assembly about the shaft 98. The actuating bar is then pulled outwardly bringing the other slide pusher 102 into engagement with the trailing edge of the slide 103' for pushing the same between the uppermost slide in the take-up area or plate 89, as the case may be, and the surfaces 92b of the rails 92. The actuating bar 95 is then lifted positioning the slide changing assembly for another cycle of operation. It will be appreciated that the slide changing assembly 94 may be actuated for returning the uppermost slide in the take-up area to the gate whereby the slides may be exhibited again in the reverse order.

While the invention has been shown in only two forms, it will be understood that the same is not to be limited. On the contrary, the invention is susceptible of various forms and modifications without departing from the spirit and scope of the appended claims. In this respect, it will be apparent that the slide changing device disclosed and claimed herein may be either horizontally or vertically oriented and associated with slide projectors and slide viewers.

I claim:

1. In a slide changing device including a reciprocating slide changer for advancing slides one at a time from a supply position to a display position and then to a take-up position, a slide magazine of the type adapted to support a plurality of slides in stack form for movement longitudinally of the magazine, said magazine including a pair of rails dividing said magazine into a slide supply area and a slide take-up area by extending between opposed marginal portions of the forwardmost slide in the supply magazine and the rearwardmost slide in the take-up area thereby positioning such slides in said supply and take-up positions, respectively, means mounting said rails for movement toward and away from each other between a first position wherein said rails extend between opposed marginal portions of the foremost slide in said supply area and the rearwardmost slide in the take-up area and a second position wherein such rails place the supply area in communication with said take-up area for permitting movement of slides between said supply area and said take-up area and vice versa.

2. In a slide magazine of the type adapted to support a plurality of slides in stack form for movement longitudinally of the magazine, the improvement comprising, means dividing said magazine into fixed slide supply and take-up areas and including at least one member arranged to extend between a pair of slides in the magazine for separating the same, said member being movable away from its position between such pair of slides thereby placing said areas in communication with each other for movement of slides longitudinally of the magazine from said supply area to said take-up area and vice versa, and biasing means in one of said areas for simultaneously returning all of the slides therein to the other area responsive to placing said areas are placed in communication with each other.

3. The improvement according to claim 2 wherein said means includes a pair of said members each in the form of a rail, said rails being movably mounted on the magazine in coplanar relation with each other for extending only between opposed marginal portions of said pair of slides.

4. In a slide magazine of the type adapted to support a plurality of slides in stack form for movement longitudinally of the magazine, the improvement comprising, means on the magazine dividing the same into a slide supply area and a slide take-up area and including movably mounted, generally coplanar, parallel rails, means mounting the rails for movement back and forth between a first position wherein the rails extend between opposed marginal portions of a pair of slides thereby separating the same and a second position wherein the rails are moved outwardly of the magazine away from said first position thereby to place said areas in communication with each other for movement of slides longitudinally of the magazine from said supply area to said take-up area and vice versa, a slide holding device detachably received in said supply area, said device being adapted to hold a plurality of slides in stack form and being of box-like shape including a pair of opposed walls and at least one other wall connecting said opposed walls adjacent one end of the device, the ends of said opposed walls at the other end of said box being free from said other wall thereby permitting said ends to flex toward and away from each other, retaining means at said one end of the device for preventing exit of slides therefrom, said ends of said opposed walls having respectively a pair of inwardly extending lips for supporting engagement with opposed marginal portions of a slide in the device, said lips being in parallel relation with said rails and receiving the latter therebetween, whereupon said rails, upon movement to said another position thereof, engage said lips and flex the same outwardly of the magazine in non-interfering relation with movement of slides back and forth between said magazine areas.

5. A slide changing device comprising, a slide magazine of the type adapted to support a plurality of slides in stack form for movement longitudinally of the magazine, dividing means on the magazine dividing the same into a slide supply area and a slide take-up area, said dividing means being adapted to engage marginal portions of slides and defining an open space communicating said areas with each other, a slide changing assembly including a slide projection gate and a slide changer mounted for reciprocal movement relative to said gate and transversely of said magazine for moving slides back and forth between the gate and the magazine, which changer includes a slide pushing tongue, means mounting said slide changing assembly for shifting movement relative to the magazine thereby to position said tongue for alternate sliding movement across said supply and take-up areas, said tongue being positioned on said changer so as to pass through said space during shifting movement of said slide changing assembly.

6. The slide changing device according to claim 5 wherein said slide changing assembly is shiftably mounted for reciprocal movement relative to the magazine longitudinally thereof.

7. The slide changing device according to claim 5 wherein said slide changing assembly is shiftably mounted for swinging said tongue back and forth through said open space.

8. A slide changing device comprising, a slide magazine of the type adapted to support a plurality of slides in stack form for movement longitudinally of the magazine, means on the magazine dividing the same into a slide supply area and a slide take-up area and including a pair of opposed, generally coplanar, parallel rails, a slide changing assembly including a slide projection gate and a slide changer mounted for reciprocal movement relative to said gate and said magazine in a plane generally perpendicular to the longitudinal axis of the magazine, said slide changing assembly being mounted for shifting movement relative to the magazine generally longitudinally thereof between first and second positions, said slide changer including a slide pushing tongue reciprocal along a path generally parallel with said rails and adapted, when said assembly is in said first position, to push a slide to said gate from a position in said supply area adjacent said rails, and also adapted, when said assembly is in said second position, to push a slide to said gate from a position in said take-up area adjacent said rails, said slide changer including other pushing means for pushing the slide from said gate to a position in said supply area adjacent said rails when said assembly is in said first position and to push a slide from said gate to a position in said take-up area adjacent said rails when said assembly is in said second position, said tongue having a width less than the spacing between said rails thereby to permit the former to pass between the latter during shifting movement of said assembly between its first and second positions.

9. A slide changing device comprising, a magazine including a pair of generally parallel, spaced rails dividing the magazine into supply and take-up areas, a slide changing assembly mounted adjacent the magazine and including a slide pushing tongue supported for reciprocating movement relative to the magazine along a path generally parallel with said rails, said slide changing assembly being shiftable relative to said magazine generally longitudinally thereof for positioning said tongue to pass along opposite sides of said rails during reciprocating movement of the former along said path, a slide projection gate mounted on one side of said magazine adjacent said rails for receiving a slide pushed from the magazine by said tongue, said gate being disposed in the plane of movement of said tongue along said path and being shiftably mounted with said assembly for remaining in said plane during shifting of the slide changing assembly, said tongue having a portion intermediate its ends with a width less than the spacing between said rails thereby to permit said tongue to pass between the rails during shifting of the slide changing assembly.

10. The slide changing device according to claim 9 wherein the pushing end of said tongue is wider than the space between said rails for sliding along opposite sides of the latter during a portion of the stroke of movement of said tongue along said path.

11. The slide changing device according to claim 9 wherein said rails are mounted for movement outwardly of the magazine thereby to place said areas in communication with each other for movement of slides longitudinally of the magazine back and forth between said areas.

12. The slide changing device according to claim 11 further defined by, biasing means in one of said areas for simultaneously returning all of the slides therein to the other area when said areas are placed in communication with each other.

13. A slide changing device comprising, a magazine including a pair of parallel, spaced rails contained in a plane generally perpendicular to the longitudinal axis of the magazine and dividing the same into supply and take-up areas, a slide changing assembly mounted adjacent the magazine and including a slide pushing tongue movable along a path generally parallel with said rails back and forth between a first position wherein said tongue is disposed outwardly of said magazine with the pushing end thereof adjacent one side of the magazine and a second position wherein said tongue extends across said magazine with the pushing end thereof disposed outwardly of the other side of the magazine, said slide changing assembly being shiftable relative to said magazine generally longitudinally thereof for positioning said tongue to pass along opposite sides of said rails during reciprocating movement of the former between said first and second positions, a slide projection gate mounted adjacent said other side of said magazine and adjacent said rails for receiving a slide pushed from the magazine by said tongue, said gate being disposed in the plane of movement of said tongue along said path and being shiftably mounted with said assembly for remaining in said plane during shifting of the slide changing assembly, said tongue having a portion intermediate its ends with a width less than the spacing between said rails thereby to permit said tongue to pass between the rails during shifting of the slide changing assembly with said tongue in said second position.

14. The slide changing device according to claim 13 wherein the pushing end of said tongue is wider than the spacing between said rails for sliding along opposite sides of the latter during a portion of the stroke of movement of said tongue between said first and second positions.

15. The slide changing device according to claim 13 wherein said rails are mounted for movement outwardly of the magazine thereby to place said areas in communication with each other for movement of slides longitudinally of the magazine back and forth between said areas.

16. The slide changing device according to claim 15 further defined by, biasing means in one of said areas for simultaneously returning all of the slides therein to the other area when said areas are placed in communication with each other.

17. The slide changing device according to claim 13 further defined by, said projection gate being mounted for said shifting movement independently of said slide changing assembly, means for shifting said projection gate in response to corresponding shifting movement of said slide changing assembly.

18. A slide holding device for use with a stack-type magazine having a pair of parallel, spaced rails extending across respective opposite sides of the magazine and extending between respective marginal portions of a pair of slides therein thereby dividing the magazine into supply and take-up areas, means mounting said rails for movement toward and away from their position between said pair of slides thereby alternately to separate said areas and to place said areas in communication with each other, movement of slide longitudinally of the magazine back and forth between said areas being permitted when said areas are in communication with each other, said device being of box-like shape and adapted to be detachably received in said supply area for holding a stack of slides therein, said device including spaced parallel side walls and another wall connecting the former adjacent one end of the device, the ends of said side walls at the other end of the device being free to flex toward and away from each other, said ends of said side walls including respectively a pair of inwardly extending lips arranged to engage marginal portions of a slide for preventing exit of the same from the associated end of the device, said lips receiving respective rails in parallel relation therebetween when the device is detachably received in the supply area whereupon movement of said rails away from each other causes corresponding movement of said lips.

References Cited
UNITED STATES PATENTS

| | | | |
|---|---|---|---|
| 2,513,102 | 6/1950 | Parlini et al. | 40—79 |
| 2,583,442 | 1/1952 | Parlini et al. | 40—79 |
| 2,812,056 | 11/1957 | Jenkins. | |
| 2,893,146 | 7/1959 | Geiger | 40—79 |
| 3,002,426 | 10/1961 | McCabe | 40—79 X |
| 3,077,817 | 2/1963 | Enemann | 40—79 X |
| 3,147,859 | 9/1964 | Misuraca | 40—79 X |

JEROME SCHNALL, *Primary Examiner.*

RICHARD CARTER, *Assistant Examiner.*